(12) United States Patent
Nguyen et al.

(10) Patent No.: US 12,429,430 B2
(45) Date of Patent: Sep. 30, 2025

(54) ADAPTIVE LIGHTING SYSTEM AND METHOD FOR INSPECTION OF COMPLEX OBJECTS

(71) Applicant: EMAGE EQUIPMENT PTE. LTD., Singapore (SG)

(72) Inventors: Trung Hieu Nguyen, Tay Ninh Province (VN); Soon Wei Wong, Singapore (SG); Soon Chye Lian, Singapore (SG)

(73) Assignee: EMAGE EQUIPMENT PTE. LTD., Singapore (SG)

( * ) Notice: Subject to any disclaimer, the term of this patent is extended or adjusted under 35 U.S.C. 154(b) by 271 days.

(21) Appl. No.: 17/895,207

(22) Filed: Aug. 25, 2022

(65) Prior Publication Data

US 2023/0062347 A1 Mar. 2, 2023

(30) Foreign Application Priority Data

Aug. 26, 2021 (SG) .......................... 10202109368Y (51) Int. Cl.
*G01N 21/88* (2006.01)
(52) U.S. Cl.
CPC ..... *G01N 21/8806* (2013.01); *G01N 21/8851* (2013.01); *G01N 2021/8816* (2013.01); *G01N 2021/888* (2013.01)
(58) Field of Classification Search
CPC .................. G01N 21/8806; G01N 21/8851
See application file for complete search history.

(56) References Cited

U.S. PATENT DOCUMENTS

| | | | | |
|---|---|---|---|---|
| 2017/0270651 A1* | 9/2017 | Bailey | ............... | H04N 23/56 |
| 2021/0360140 A1* | 11/2021 | Katzir | ............... | G01N 21/8851 |
| 2024/0255441 A1* | 8/2024 | Finazzi | ............... | G01N 21/952 |
| 2024/0354930 A1* | 10/2024 | Wilson | ............... | H04N 23/56 |
| 2024/0388806 A1* | 11/2024 | Jeong | ............... | G01N 21/9515 |

* cited by examiner

*Primary Examiner* — Christopher E Dunay
(74) *Attorney, Agent, or Firm* — Thomas Horstemeyer, LLP (57) ABSTRACT

Illumination systems and methods of designing and construction of the same are disclosed. The resulting illumination systems comprising both Front and Back light modules, provides selectable and programmable illumination according to the requirements of the invention for optimal performance of enhancing defects on a multidimensional object. The light guides are suitably aligned to the Backlight module and mechanically integrated with spring loaded mechanisms to enable them to move freely and subsequently re-postion them to a reference home position as determined at the time of setup of the illumination assembly. The Front light module is utilised to highlight surface defects and mechanically integrated to the illumination system. The illumination modules, may include multiple discrete light emitting components of different spatial intensity distribution and color spectrum mounted in specific layout such that the application oriented combined illuminating effect is created.

12 Claims, 6 Drawing Sheets

ADAPTIVE LIGHTING SYSTEM AND METHOD FOR INSPECTION OF COMPLEX OBJECTS

CROSS-REFERENCE TO RELATED APPLICATIONS

This application claims priority to, and the benefit of, copending Singapore Patent Application No. SG 10202109368Y, entitled "ADAPTIVE LIGHTING SYSTEM AND METHOD FOR INSPECTION OF COMPLEX OBJECTS" and filed on Aug. 26, 2021

FIELD OF INVENTION

The present invention generally relates to electronically controlled LED based illumination systems coupled with illumination transmitting light guides to propagate light to inaccessible areas of a multidimensional object. The invention is particularly applicable for inspection of multidimensional objects comprising angular surfaces requiring special illumination and positioning techniques for enhanced inspection.

BACKGROUND

Conventional light sources are typically bulky and complex if they are designed to illuminate multiple surfaces, especially if the objects have angular surfaces. In prior art U.S. Pat. No. 8,100,552, the illuminating device is designed using multiple light emitting components mounted in specific orientations to match the profile of an object. If the profile of the object to be inspected changes, a new illuminating module is required to be designed to achieve uniform illumination across the object, making the approach complex, time consuming and expensive. They are neither flexible nor scalable which makes them difficult to scale and adapt to new types of objects with different surface profiles.

Typical solid state LEDs are commonly used in various configurations to enable the light distribution to be uniform across the object. The final configurations for a specific object may still have uneven intensities of illumination across the area of the object, resulting in inconsistencies and unreliable measurement of defects. Moreover, they are bulky and occupy precious real estate within the inspection system.

The current technology lacks the apparatus and methodology to uniformly illuminate the complex three dimensional object without compromising on the quality and accuracy of defect inspection and related measurements.

SUMMARY

The invention relates to an efficient and flexible illumination system consisting of a illumination module suitably coupled with a set of light guides that are planar, rectangular or circular made from acrylic or other light transmitting material mounted with appropriate retractable springs and suitably arranged on a platform comprising at least two parallel plates, that allows free movement of the light guides along its vertical axis. When the object to be inspected is positioned under the camera, they are positioned to rest on the light guides, which move, adjust and orientate themselves to the profile of the object at the point of contact at one end with the other end exposed to the Backlight illumination module. With this arrangement, when the Backlight illumination is energised the light guides transmit the light towards the object resulting in uniform distribution of the light at every point of the three dimensional object. The camera captures multiple images at different positions and angles of the object for inspection. On completion of the inspection, the object is moved away from the light guides, and simultaneously the light guides move back to their home position or reference position.

The object is next illuminated from the Top using the Top light illumination module followed by capture of multiple images of different areas of the object at different angles.

The camera may also be used by an operator to view the illuminated object surface, to perform measurements of defects or features. Typical case of manual inspection or viewing is used during the process of setup and configuration of the inspection system.

One of the main advantages of such an arrangement enables easy adaptation of the illumination modules to a variety of complex objects with three dimensional features or defects on their surfaces. The flexible adaptation of moving light guides coupled with the programmability of the illumination systems makes the illumination system very flexible and scalable, resulting in quick reconfiguration of the illumination setup during product changeovers.

The next advantage of the invention is in reliably illuminating angular surfaces of the object, which has not been possible with current art. Features on angular surfaces can also be reliably inspected when the object is appropriately tilted using integrated motors that are coupled to the inspection assembly, so an optimum view is presented to the camera.

Another advantage of the invention is the positioning of the backlight module that may be achieved using the air cylinders that are mechanically coupled to the backlight module. Enhanced images of the object captured by the camera under multiple lighting conditions enables measurement of fine defects and features that are more pronounced.

Other aspects of the invention include various combinations of one or more of the foregoing aspects of the invention, as well as the combinations of one or more of the various embodiments thereof as found in the following detailed description or as may be derived therefrom. It should also be understood that other embodiments of the invention may be derived by those of ordinary skill in the art both from the following detailed description of a particular embodiment of the invention.

DESCRIPTION OF THE DRAWINGS

The specific features, aspects, and advantages of the invention will become better understood with regard to the following description, appended claims, and accompanying drawings where:

DETAILED DESCRIPTION OF THE DRAWINGS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

Figure 1:
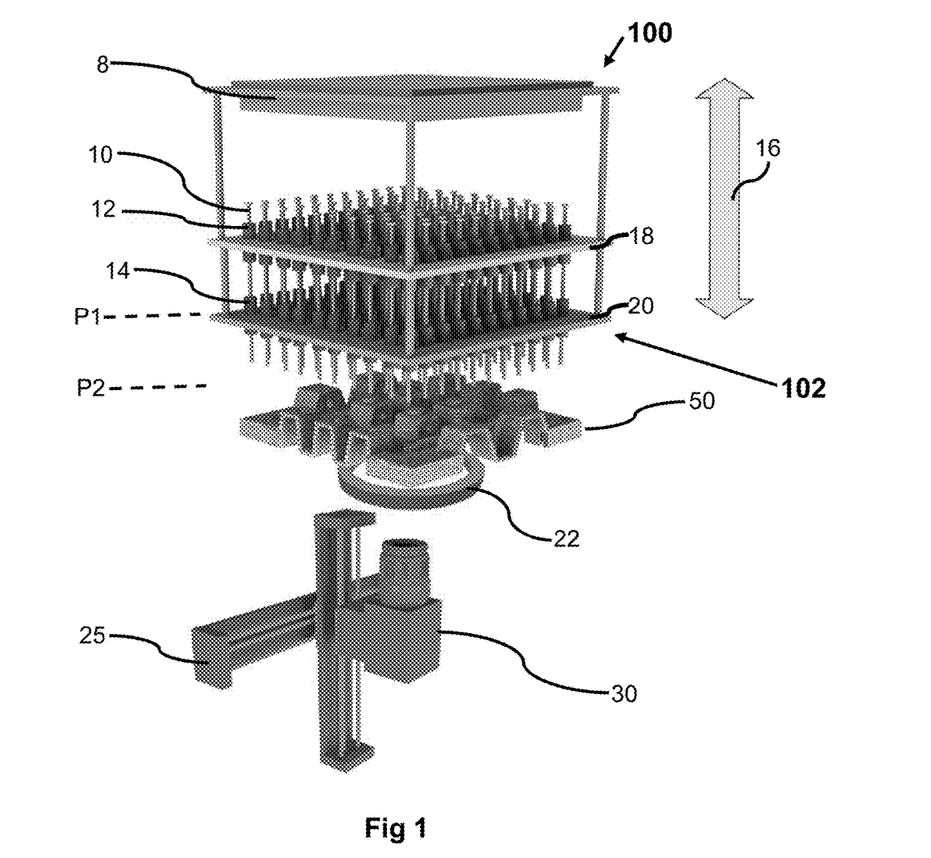
FIG. 1 represents a system of all the elements making up a preferred embodiment of this invention.

A first embodiment of the system and method according to the invention is shown in FIG. 1. The system 100 shows, in pictorial form, an embodiment of a first aspect of the present invention which is an apparatus for inspecting defects in complex three dimensional objects including their angular surfaces. Defects such as dimension of holes, markings on their surfaces, absence and presence of molded features, scratches, contaminants & all edge defects around the object may be measured.

The first embodiment 100 in FIG. 1 comprises a high resolution camera 30, mounted on a XY motorised table 25 (Motors not shown), at least two illuminating light sources, a ring light or Top light 22 and a flat LED backlight 8. The backlight 8 is mechanically and optically coupled to a set of light guides 10 or otherwise referred to as arrays of light transmitting elements which are preferably made of efficient light dispersing material. The light guide assembly is designed with two metal plates 18 and 20 drilled with identical and symmetrical holes. Every aligned hole in plates 18 and 20 are configured to hold a spring loaded unit 12 and 14 respectively, through which a set of light guides 10 is mounted and held in a position P1 referred to as Home position or a reference position, which may be adjustable depending upon the application. The number of light guides 10 used is determined by the application. The set of light guides 10 are vertically displaceable through the mechanism of a set of spring loaded bearings 12 and 14. The light guides 10 may be fabricated using acrylic resin, polycarbonate or similar material with high dispersion characteristics to enable the illumination of the object around the angular surfaces as well as uneven surfaces at different locations and different depths. The set of light guides 10 may also be designed with different angles, thickness or profiles to adapt to different types of objects making them scalable and cost effective.

When the Backlight sub assembly 102 is moved to position P2 in the vertical direction 16, the set of light guides 10 are appropriately displaced to take the profile of the top surface of the object 50. The Backlight sub-assembly 102 comprising elements 8, 10, 12, 14, 18 and 20 are mechanically integrated together, and driven by a motor (not shown). The motor is driven to vertically move the Backlight illumination module between position P1 and P2 shown in FIG. 1.

It is important to note that people skilled in the art know that several different vertical positions may be programmed to suit different types of object profiles. A separate Front illumination module 22 is suitably coupled to another Motor (not shown) to enable it to be positioned at different positions below the object. The Backlight illumination module 8 and Front illumination module 22 are fabricates using a segmented design, with different wavelength LEDs and electronically coupled to a strober (not shown), that may be programmable to trigger the illumination at different time intervals, with different pulse duration, different intensities and different light spectrum for enhancing the defect features of the object 50 and aid image capture under different illumination conditions.

Figure 2:
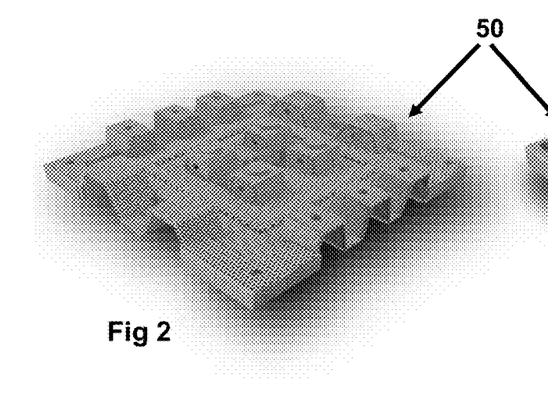
FIG. 2 is an illustration of the three dimensional object's top surface.
Figure 3:
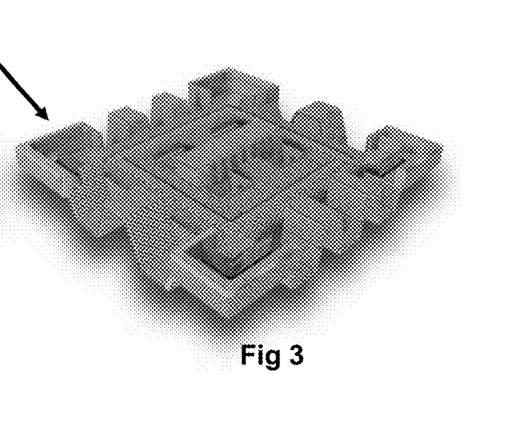
FIG. 3 is an illustration of the three dimensional object's bottom surface.

FIG. 2 and FIG. 3 illustrate the Top view and Bottom view of a typical object 50, respectively. As evident, the object 50 has multiple three dimensional profiles and may be porous or comprise cutouts suitable for particular application. It may also comprise various angular surfaces around the object.

Figures 4, 4A, 4B:
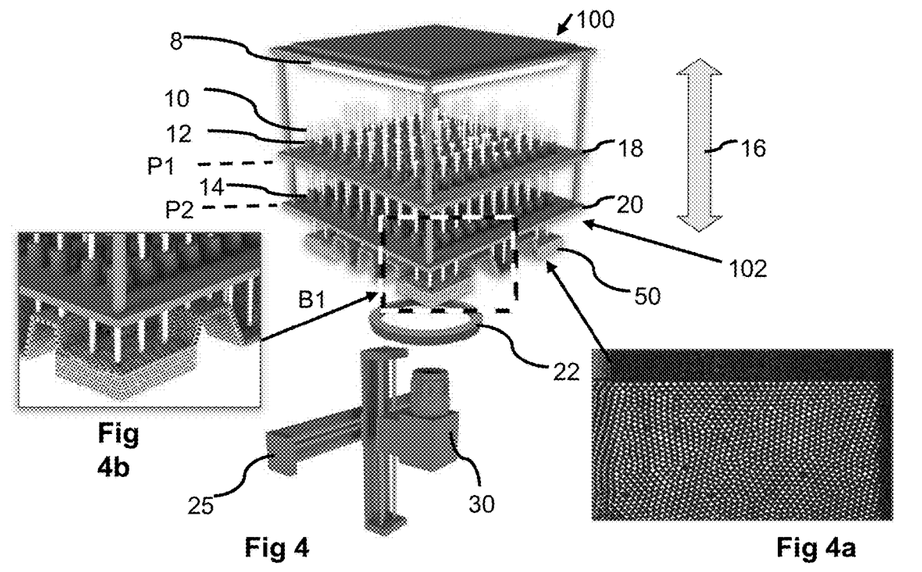
FIG. 4 is an illustration of one aspect of the preferred embodiment of this invention.
FIG. 4a is an image of an area of the object with the backlight illumination turned ON in FIG. 4.
FIG. 4b is an exploded view of the image area enclosed in FIG. 4.

FIG. 4 illustrates an inspection technique in the first embodiment of the invention for inspecting defects on the object 50. In this technique, the Backlight illumination sub assembly 102 is moved down to position P2 while simultaneously displacing the set of light guides 10 to touch the top surface of the object 50. A magnified image of the box B1 enclosing the area in FIG. 4 is shown in FIG. 4b. The displacement of the set light guides 10 is clearly visible in FIG. 4b. The Backlight illumination 8 as earlier explained, is fabricated with LEDs that may be segmented to illuminate every light guide individually or simultaneously, allowing for a highly complex illumination control mechanism. At the position P2 in FIG. 4, the Backlight 8 and camera 30 are triggered or strobed to illuminate the set of light guides 10, and simultaneously capture an image of the area of interest in object 50, as illustrated in FIG. 4a. Subsequently the XY table 25 is moved from one area of interest to the next, until the surface area of the object has been imaged by Camera 30. The images are then assembled appropriately to arrive at the full image of the object 50 for further analysis and classification. Subsequently the results of the inspection are communicated through an external interface for segregation and sorting.

Figures 5, 5A:
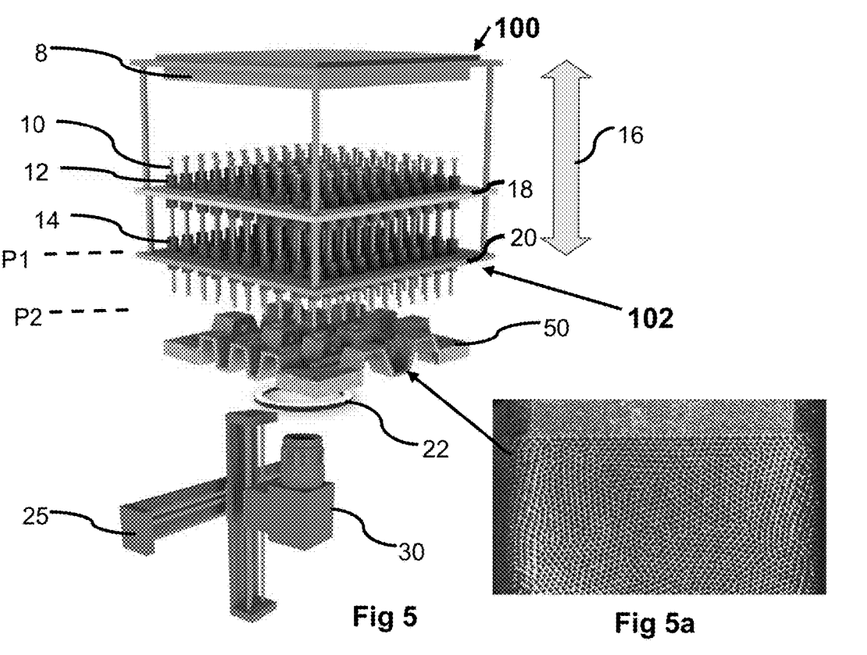
FIG. 5 is an illustration of another aspect of the preferred embodiment of this invention.
FIG. 5a is the image of an area of the object with the Front light illumination turned ON in FIG. 5.

FIG. 5 illustrates an inspection technique of the invention for inspecting defects at the bottom surface of the object 50. In this technique, the Backlight illumination sub assembly 102 is moved up to the reference position P1, while simultaneously displacing the set of light guides 10 to move away from the top surface of the object 50 by the spring loaded bearings 12 and 14. At position P1, the Backlight 8 is turned OFF and the Ring light 22 is turned ON to illuminate the bottom surface of the object 50. The Ring light 22 and camera 30 are triggered or strobed to illuminate the bottom surface, and simultaneously capture an image of the area of interest in object 50, as illustrated in FIG. 5a. Subsequently the XY table 25 is moved from one area of interest to the next, until the surface area of the object has been imaged by Camera 30. The images are then assembled appropriately to arrive at the full image of the object 50 for further analysis and classification. Subsequently the results of the inspection are communicated through an external interface for segregation and sorting.

Figure 6:
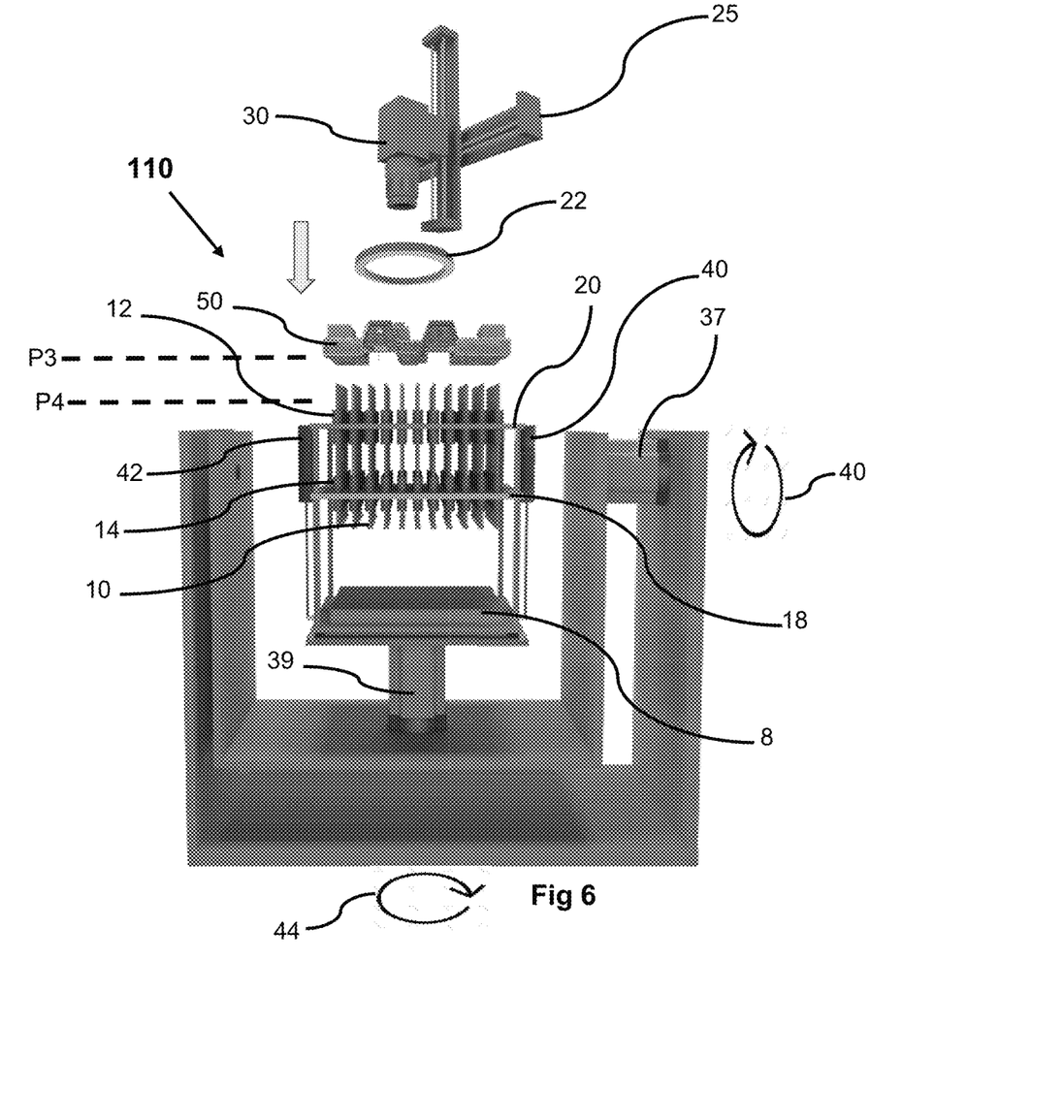
FIG. 6 represents a system of all the elements making up another embodiment of this invention. The system is designed to rotate the object in two different axes, to enable inspection of the object at different angles using either a top light illumination or Backlight illumination.

FIG. 6 illustrates an inspection technique in a second embodiment of the invention for inspecting defects on the object 50. In this embodiment 110, the Backlight illumination sub assembly 102 is the same as in FIG. 1, but mounted in reverse with the set light guides 10 facing up. The Backlight illumination sub assembly 102 further comprises a pair of air cylinders 40 and 42 mechanically mounted on plates 18 and 20 to drive the backlight 8 up and down. is further coupled to another motor 39. The backlight illumination sub assembly 102 is further mounted on another mechanism that is suitably coupled to another motor 37. Motors 39 and 37 enable the movement of 110 in two different axes. Motor 39 is utilised to rotate 110 along with the object 50, in the rotary axis 44 and motor 37 is utilised to move 110 along with the object 50, in the rotary axis 40. The set of air cylinders 40 and 42 provided, enable displacement of Backlight 8 vertically, between two or more positions which may be preprogrammed. The air cylinders 40 and 42 also serve to displace the set light guides 10 to a position as determined by the software program. The Ring light 22 in FIG. 6 illuminates the top surface of object 50 and Back light 8 illuminates the bottom surface of object 50 through the set of light guides 10. Camera 30 mounted on XY table 25 is positioned to capture images of the top surface of the object 50 in FIG. 6.

Figures 7, 7A:
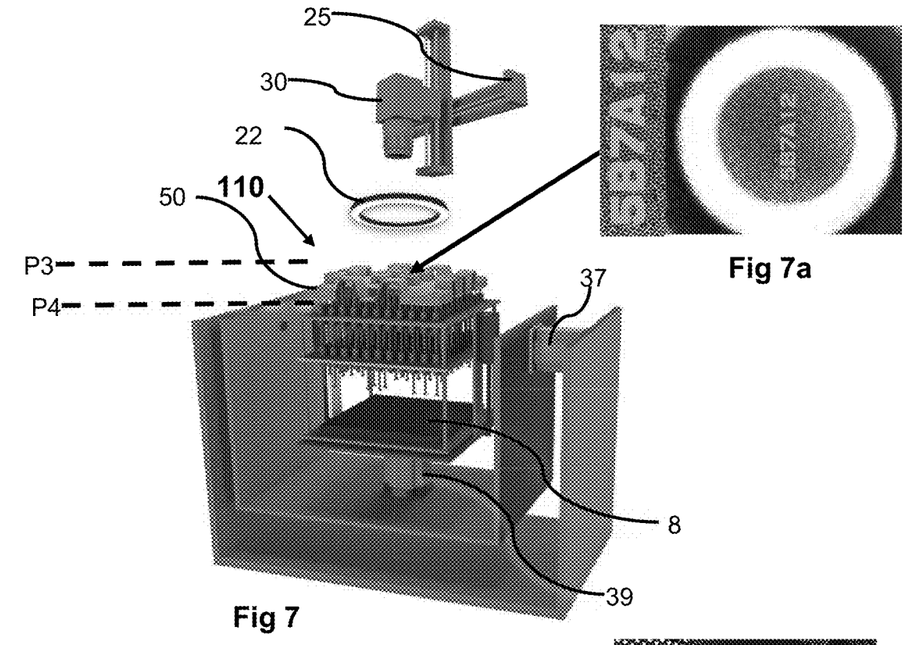
FIG. 7 is an illustration of the system showing an aspect of the embodiment in FIG. 6.
FIG. 7a illustrates an image of a top light illuminated area of the object 50 in FIG. 7.

The first process step of inspection in the second embodiment shown in FIG. 7, is initiated with the object 50 moved down from position P3 to position P4, towards the light guides 10. The light guides 10 position themselves at their respective points at the bottom surface of the three dimensional object 50. As earlier explained, the light guides 10 are integrated to the plates 20 and 18 through spring loaded guiding units 12 and 14 respectively, allowing them to move freely along the vertical axis. After the object 50 is positioned at the predetermined location P4 as shown in FIG. 7, the Camera 30 captures the image of a predetermined area of interest on the top surface of the object 50 when it is synchronously strobed with the Ring light 22 for illumination. An image of a typical area of interest is illustrated in FIG. 7a, where the symbols printed on the surface of the object 50 are enhanced. Subsequently the XY table 25 is moved from one area of interest to the next, until the surface area of the object has been imaged by Camera 30. The images are then assembled appropriately to arrive at the full image of the object 50 for further analysis and classification. Subsequently the results of the inspection are communicated through an external interface for segregation and sorting.

Ring Light 22 in FIG. 7, is mechanically integrated to the XY table 25, and appropriately positioned and strobed during image capture, to enhance defects such as surface scratches, stains, symbols, markings. etc on the object 50.

Figures 8, 8A:
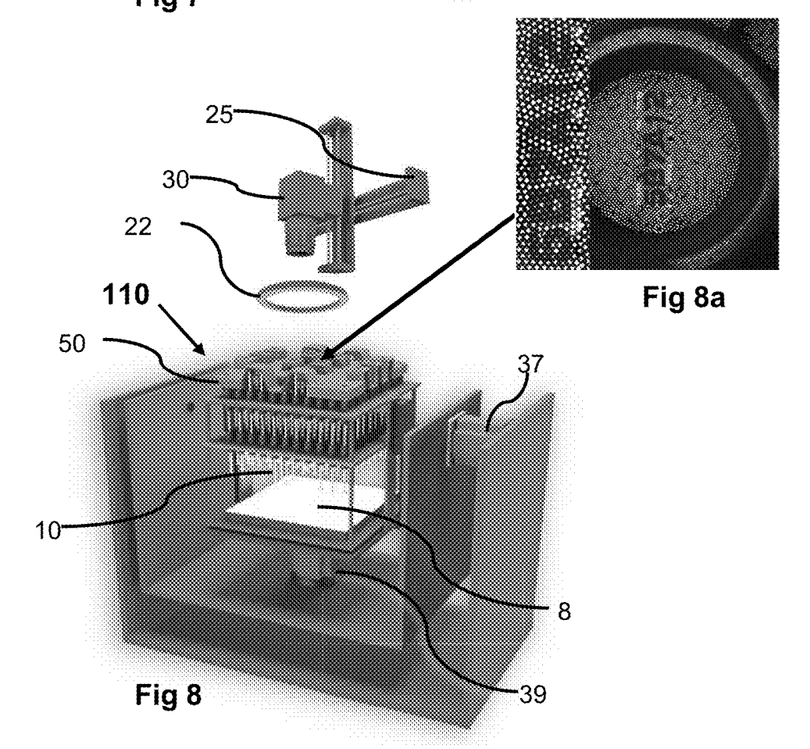
FIG. 8 is an illustration of the system showing another aspect of the embodiment in FIG. 6.
FIG. 8a illustrates an image of a Backlight illuminated area of the object 50 in FIG. 8.

In the second process step shown in FIG. 8, the Ring light is turned OFF and the Backlight 8 is strobed for the camera 30 to capture an image of an area of interest in object 50. An image of a typical area of interest is illustrated in FIG. 8a, where the symbols printed on the object 50 are clearly visible along with the enhanced perforations or holes. The captured image with the Backlight 8 illuminated, aids in detecting missing holes, damaged holes, incorrect dimension holes and other defects visible in the backlit image. Subsequently the XY table 25 is moved from one area of interest to the next, until the surface area of the object has been imaged by Camera 30. The images are then assembled appropriately to arrive at the full image of the object 50 for further analysis and classification. Subsequently the results of the inspection are communicated through an external interface for segregation and sorting.

Figures 9, 9A:
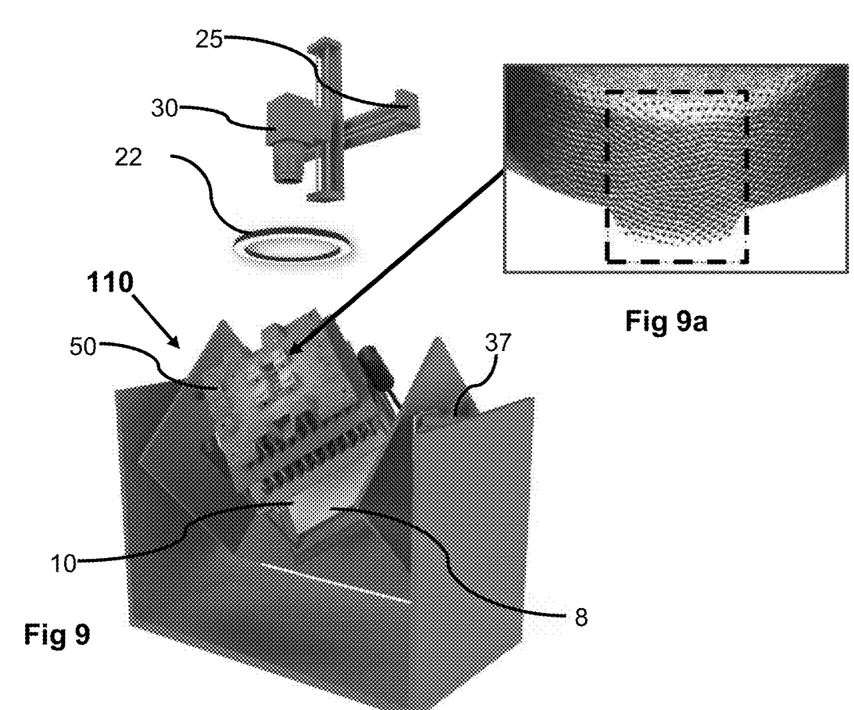
FIG. 9 is an illustration of the system showing yet another aspect of the embodiment in FIG. 6.
FIG. 9a illustrates an image of a Top light illuminated area of a slope in the object 50 of FIG. 9.

In the third process of inspection in the second embodiment is shown in FIG. 9. It is initiated with the object 50 moved down from position P3 to position P4, towards the light guides 10 as in FIG. 7. After the object 50 is positioned at the predetermined location P4 as shown in FIG. 7, the motor 37 rotates to a preprogrammed angle to present the elevated and angular sides of the object 50 to the Camera 30. The camera 30 captures the image of a predetermined area of interest of the object 50 while synchronously strobing the top light or Ring light 22 for illumination. An image of a typical area of interest is illustrated in FIG. 9a, where the surface features at the angular surfaces of the elevated structures on the object 50 are enhanced. The Ring Light 22 which is also integrated to the XY table 25, is appropriately positioned and strobed, to enhance defects such as surface scratches, stains, symbols. etc on the object 50. In the next step, the motor 39 rotates to position the object 50 to the next area of interest as programmed in the software. The process continues until the entire area of the object 50 is imaged. The images are then assembled appropriately to arrive at the full image of the relevant angular surface of the object 50 for further analysis and classification. Subsequently the results of the inspection are communicated through an external interface for segregation and sorting.

A fourth process step includes repositioning the object 50 at a different preprogrammed angle by rotating motor 37, and repeating the entire third process again until all the preprogrammed angles are executed.

Figures 10, 10A:
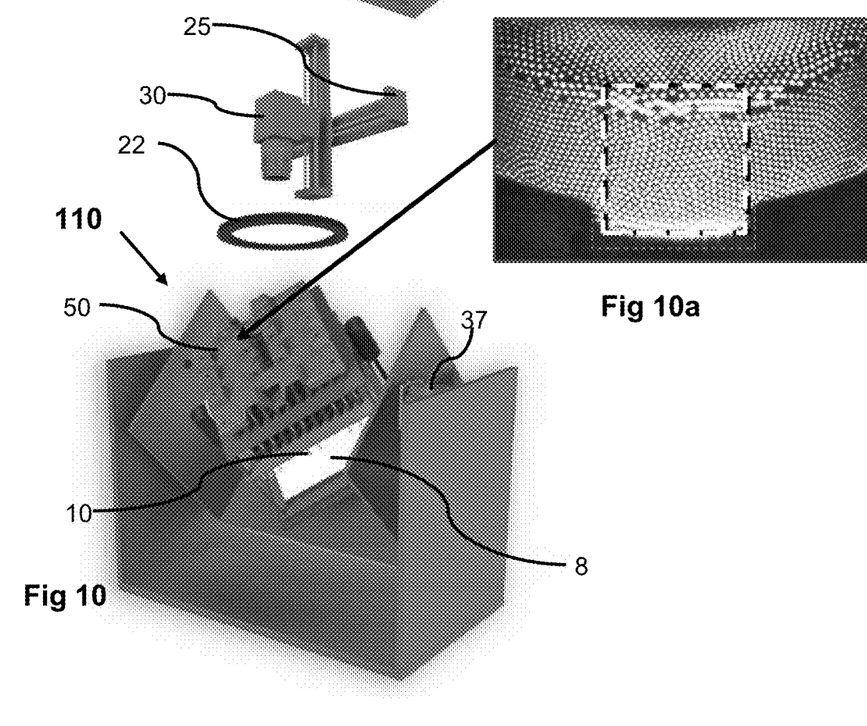
FIG. 10 is an illustration of the system showing yet another aspect of the embodiment in FIG. 6.
FIG. 10a illustrates an image of a backlight illuminated area of a slope in the object 50 of FIG. 10.

In the fifth process step shown in FIG. 10, the Ring light is turned OFF and the Backlight 8 is turned ON or strobed. After the object 50 is positioned at the predetermined location P4 as shown in FIG. 7, the Camera 30 captures the image of a predetermined area of interest of the object 50 while synchronously strobing the Backlight 8 for illumination.

An image of a typical area of interest is illustrated in FIG. 10a, wherein the perforations located at the angular surface of the object 50 is clearly visible. The process continues until the entire area of the object 50 is imaged. The images are then assembled appropriately to arrive at the full image relevant angular surface of the object 50 for further analysis and classification. Subsequently the results of the inspection are communicated through an external interface for segregation and sorting.

The captured images in the fifth process step aids in detecting missing holes, damaged holes, incorrect dimension holes and other defects visible in the backlit image at the angular surfaces of the object 50.

In a sixth process step with the Backlit 8 illuminated, the XY table is moved from one area of interest to the next as programmed in the software. Subsequently, the motor 39 rotates to position the object 50 at different points around it, for capturing images with Backlit illumination. The process continues until the angular surfaces of the entire area of the object 50 is imaged. The images are then assembled appropriately to arrive at the full image relevant angular surface of the object 50 for further analysis and classification.

Subsequently the results of the inspection are communicated through an external interface for segregation and sorting.

It is very important to note that a skilled person can change the angle of the object and modify the illumination sequence and characteristics such as intensity, wavelength and strobing pulse duration, and also utilise segmented illumination to highlight different features on the surface of the object 50.

Figure 11:
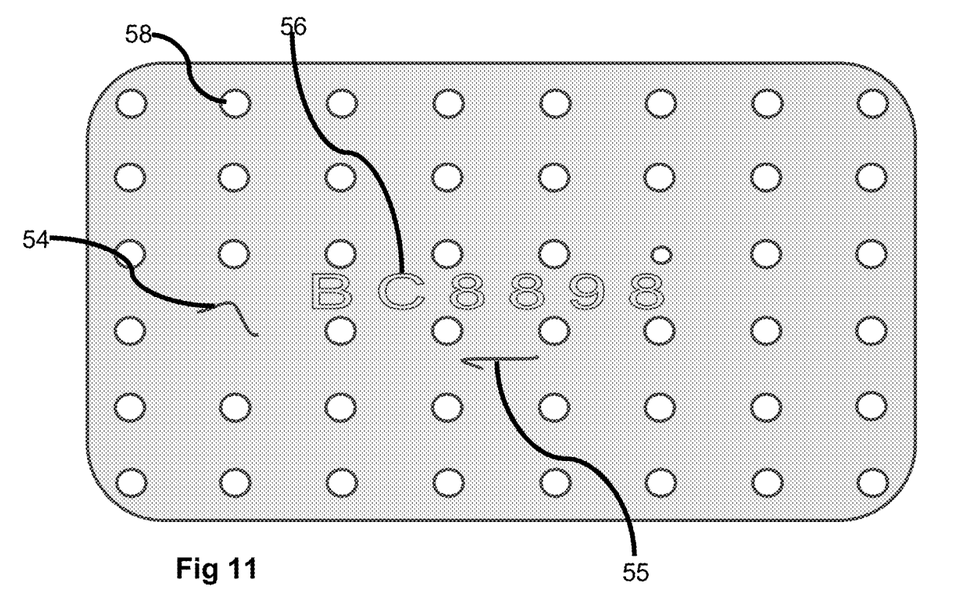
FIG. 11 represents an image of a top light illuminated area of an object in FIG. 2.

FIG. 11 is an illustration of a Top light or Ring light illuminated surface to show how the enhancement of markings and surface defects such as 56 and 54 & 55 are achieved respectively.

Figure 12:
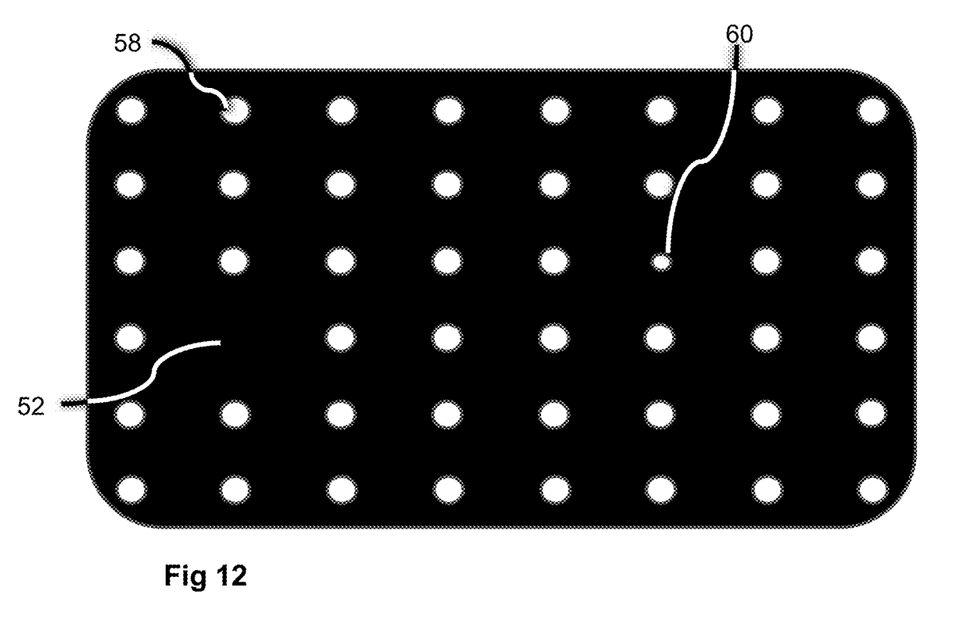
FIG. 12 represents an image of a Back light illuminated area of an object in FIG. 2.

FIG. 12 is an illustration of a Backlight illuminated surface to show how the enhancement of perforations such as 58 and 60 are achieved. It is evident that the perforation diameter is easily and accurately measured in a Backlit image apart from detecting missing perforation 52 or inaccurately spaced perforations.

Having now described a few embodiments of the invention, it should be apparent to those skilled in the art that the foregoing is merely illustrative and not limiting, having been presented by way of example only. Numerous modifications and other embodiments are within the Scope of one of ordinary skill in the art and are contemplated as falling within the scope of the invention as defined by the appended claims and equivalents thereto.

The invention claimed is:

1. An illuminating system intended for substantially illuminating a multidimensional object with perforations and angular surfaces, to inspect for defects such as foreign material contamination, inaccurate dimensions of perforations, defects in marking and damaged surfaces, the system comprising:
   a) a high resolution camera for image capture, mounted on an XY table for positioning the camera at a predetermined location;
   b) an array of LEDs mounted on a flat plate that operates as a backlight illumination that are suitably segmented to enable selected and pre-programmed segments to be illuminated using a strober, to illuminate one end of a series parallel mounted acrylic based light guides;
   c) a circular LED based ring light used as front illumination wherein the LEDs are suitably segmented to enable selected and pre-programmed segments to be illuminated using a strober;
   d) a plurality of retractable spring mounted lightguides to propagate light, arranged parallel to each other on a pair of plates mechanically coupled to the backlight illumination;
   e) at least a pair of air cylinder based displacement mechanism to move the backlight illumination to more than one predetermined positions;
   f) a first mounting system to rotate the backlight illumination sub-assembly around the central axis of the camera & optical system;
   g) a second mounting system to rotate the backlight illumination sub-assembly in an axis perpendicular to the first mounting system;
   h) an object positioning mechanism to suitably position the object to be inspected at several predetermined locations; and
   i) a strobing system to control the trigger pulse duration, and illumination intensity.

2. The illuminating system of claim 1 wherein the surface of the object to be inspected comprising several types of cavities, holes and angular surfaces which are not equidistant from the camera.

3. The illuminating system of claim 1 wherein the ends of the lightguides mechanically integrates with a flatbed backlit illumination.

4. The illuminating system of claim 1 wherein the ring light located on the opposite side of the backlight illumination is used for top illumination.

5. The illuminating system of claim 4 wherein the ring light is user programmed to illuminate the markings on the surface of the object to inspect for defects in symbols.

6. The illuminating device of claim 1 wherein the backlight illumination is segmented to enable a programmable illumination to implement selective segment illumination, intensity control and trigger pulse width control.

7. The illuminating system of claim 1 wherein the retractable lightguides disposed on at least two mounting plates are uniquely positioned to take the profile of the object to be inspected, so as to enable substantially uniform illumination distribution.

8. A method for substantially illuminating a multidimensional object with perforations and angular surfaces, to inspect for defects such as presence of foreign material contamination, inaccurate dimensions of perforations, damaged surfaces and defects in marking, the process comprising:
   a) a positioning method to locate the object to be inspected, close to light guides to ensure all uneven surfaces are uniformly illuminated;
   b) a program to strobe a backlight illumination and a front light illumination concurrently or alternately to enhance different features of the object at different angles;
   c) a set of air cylinders mechanically integrated to the backlight illumination to emit light at one end of all the light guides for the light to propagate and illuminate the object under inspection at another end, said backlight illumination configured to be vertically movable;
   d) moving a set of air cylinders mechanically integrated to the backlight illumination, to reset the light guides at a predetermined reference position after the completion of image capture;
   e) a moving front light illumination ring light suitably integrated to a camera XY table, for positioning at different locations for illuminating an area of the object under inspection;
   f) an angular positioning method to rotate the object to several preset locations determined during calibration, and to ensure images of an entire area of the object are captured at a high resolution;
   g) a method to operate a first motor to rotate the backlight illumination sub-assembly around a central axis of an inspection system;
   h) a method to operate a second motor to rotate the backlight illumination sub-assembly in an axis perpendicular to the first backlight illumination system to position the object at an angle at several angular surfaces of the object; and
   i) a method to trigger a strobing system to control trigger pulse duration, LED segment selection and intensity of the backlight and front light illuminations.

9. The illuminating method of claim 8 wherein a surface of the object to be inspected comprises several types of cavities, multi-dimensional holes and angular surfaces which are not equidistant from the camera.

10. The illuminating method of claim 8 wherein the ends of the light guides rest on the surface of the object so as to illuminate angular surfaces and uneven surfaces to achieve uniform illumination across the entire inspection area.

11. The illuminating method of claim 8 wherein the backlight and front light illuminations are selectively illuminated through LED segments, to enable illumination of specific predetermined areas to enable detection of defects in marking, presence of foreign material, abnormal perforations and damaged surfaces.

12. The illuminating method of claim 8 wherein the positioning method is programmed to uniquely align the object relative to the light guides for enhanced illumination of all predetermined surface areas to enable detection of defects in marking, presence of foreign material, abnormal perforations and damaged surfaces.

\* \* \* \* \*